United States Patent Office 2,717,338
Patented Sept. 6, 1955

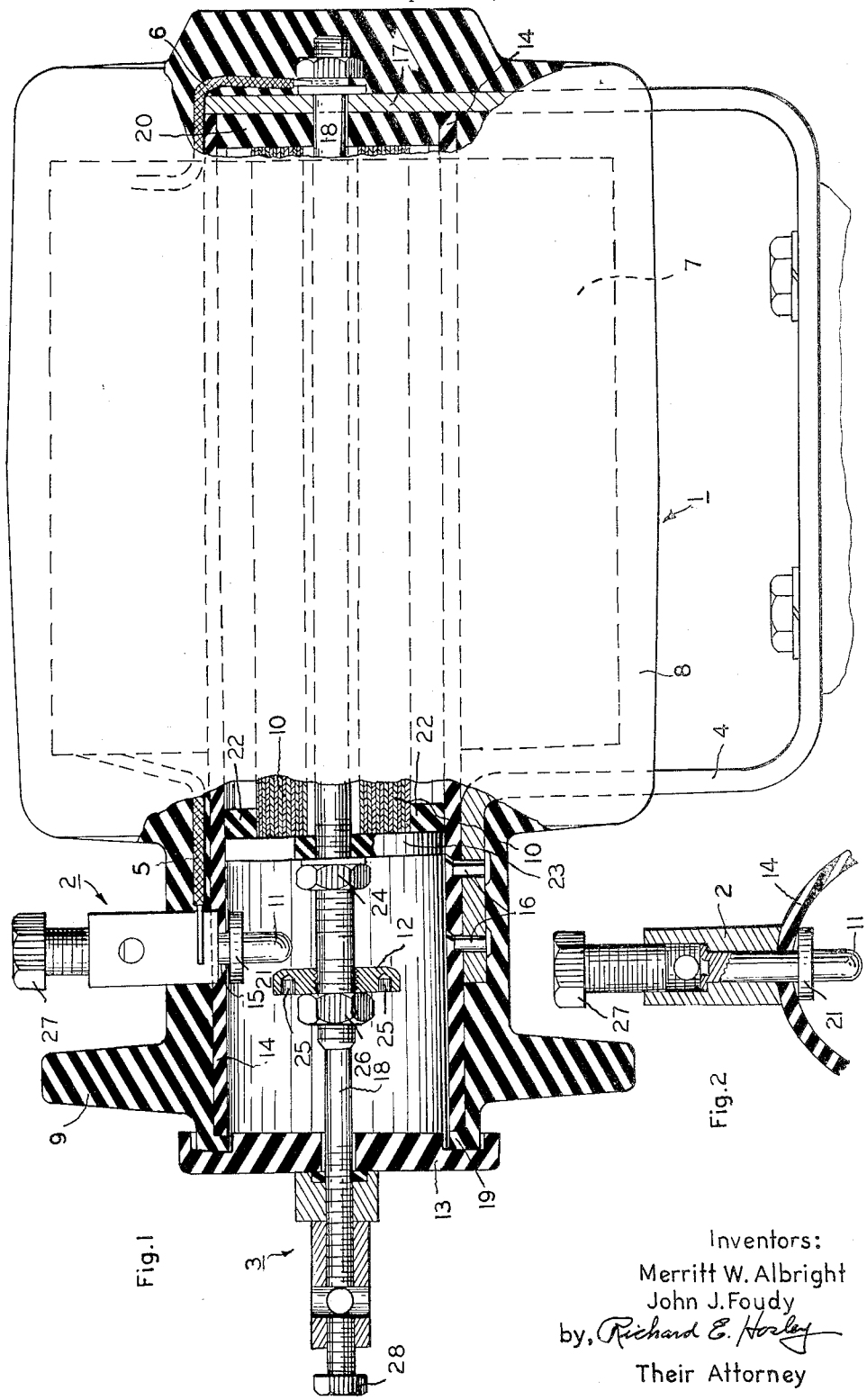

2,717,338

MOLDED REACTOR

Merritt W. Albright and John J. Foudy, Peabody, Mass., assignors to General Electric Company, a corporation of New York Application April 29, 1954, Serial No. 426,470

3 Claims. (Cl. 317—13)

The present invention relates to molded electromagnetic apparatus and, more particularly, to improved inductive reactors and the method of making such reactors molded in resilient insulating material with integral high voltage spark gap elements.

It is now established practice to embed electromagnetic apparatus, such as transformers, in rubber-like materials molded to desired external configurations. Such materials obviate the need for protective metal casings and certain insulating arrangements, because the molded materials themselves have high resistance to weathering, abrasion, and shock, and are excellent insulators. Further, their heat transfer characteristics are advantageous in applications where generated heat must be liberated, and they mold embedded parts firmly but without chemical attack and with resilience enabling temperature-induced dimensional changes to occur without attendant cracking. One suitable material for thus forming both the insulation and outer casing of electrical apparatus is the so-called GR–I (Government rubber isobutylene). The raw material, which is cured in a manner similar to the vulcanization of rubber during the molding operation, is a copolymer of a high proportion of isobutylene and a low proportion of isoprene. Other rubber-like substances which are somewhat fluid before curing and which yield firmly-resilient insulating structures having characteristics like those of butyl rubber are also contemplated, however.

In accordance with the present teachings, the aforementioned type of molding is employed in the construction of an improved inductive reactor which includes an adjustable spark gap arrangement having certain parts in common with molded reactor terminals and having means which encloses and seals the adjustable gap while affording simple access to it whenever necessary. Additionally, there is taught a method of construction which facilitates production of molded reactors having adjustable spark gap provisions. A principal object of this invention is thus to provide improved and simplified inductive reactors which are molded and which include sealed adjustable spark gap elements.

By way of a summary account of one aspect of this invention, there is provided an insulating hollow tubular member about which an electrical winding is positioned near one end. A conductive rod of length greater than the tube is located coaxially with it over its full length, with portions projecting beyond the tube at both ends, and one of the two coupling leads for the winding is connected with the rod at the projecting end nearer the wound end of the tube. The foregoing assembly is placed in a mold cavity wherein a conductive terminal is located such that it extends radially outward from the tube near the unwound end thereof and in alignment with a small radial aperture through the tube. A cylindrical mandrel having a central bore therethrough is positioned in the tube and around the central rod, extending just short of the wound end of the tube. Butyl rubber is then molded about the tube, winding, part of the terminal, and the end of the rod projecting from the wound end of the tube. The rubber molding material also closes the wound end of the tube, entering the tube for a short distance, and further forms a ring-like anti-creepage skirt between the terminal and the other end of the tube, as well as a gasketing film of material over the tube edge at said other end. With the mandrel withdrawn, core laminations are stacked in the tube about the central rod and near the wound end, and a short spark gap stud is staked to the terminal, through the tube aperture, such that the stud projects radially inward into the tube. A rounded nut is then advanced along a threaded portion of the rod until it forms a desired spark gap in relation to the stud, and a lock nut is forced against the rounded nut to hold it in place. Thereafter, an insulating end cap is locked in position over the open end of the tube, forming a tight seal in cooperation with the gasketing film over the tube edge.

Although the features of this invention which are believed to be novel are embraced by the appended claims, details of the invention as well as the further objects and advantages thereof may be most readily comprehended through reference to the following description taken in connection with the accompanying drawings, wherein:

Figure 1 illustrates a molded inductive reactor having parts broken away to reveal constructional details, and Figure 2 presents a further and partly sectionalized view of the radial terminal and spark gap stud in the apparatus of Figure 1.

The inductive reactor of Figure 1 comprises a resilient molded dielectric body or casing 1 from which project two electrical terminals 2 and 3 and a mounting bracket 4, the terminals 2 and 3 being respectively coupled with electrical leads 5 and 6 which connect with the embedded inductive winding 7 located in a position somewhat removed from these terminals. In general external appearance, the casing 1 is substantially cylindrical, with an enlarged portion 8 about the winding 7 and with a ring-like anti-creepage skirt 9 separating the electrical terminals. Laminated core elements 10 are disposed centrally within winding 7 to enhance the sought inductive effects, it being one intended application of such apparatus that it introduce compensating inductive reactance in high power circuits including large capacitive reactances. Because high voltage surges, such as those occasioned by lightning, may be expected in power distribution circuitry, it is necessary that means be provided for bypassing these surges around the relatively sensitive inductive winding 7. Spark-gap by-pass means in this apparatus comprises a stud 11 and a cooperating adjustable nut 12 which may be advanced to a position wherein an air gap having a suitable breakdown voltage is produced. Stud 11 is electrically coupled with terminal 2, and nut 12 with terminal 3, the latter preferably being grounded in its circuit connection, such that high voltage surges arcing across these spark-gap elements will leave winding 7 undamaged. Both spark-gap elements are contained within a hollowed portion of the body of the reactor, which is closed and sealed by a removable insulating cap 13, such that moisture and foreign particles cannot destroy pre-set gap lengths. As appears more fully hereinafter, the constructions employed enable simple and rapid initial assembly of the various components as well as facilitated adjustment and sealing subsequently as occasions may demand.

Manufacture of the reactor is accomplished with particular advantage by employing a hollow cylindrical member 14 as a main support, that member being of a rugged and electrically insulating material, such as Textolite and being sandblasted on its outer surfaces. A radial aperture 15 of dimensions adequate to accommodate stud 11, in a later operation, is provided near one end at the position where terminal 2 is to be located, and after winding 7 is slipped over one end of member 14, the narrow support strip or bracket 4 is staked to the tubular member 14 near one end by rivets 16. Bracket 4 has a curvature which disposes an end 17 sraight across the opposite end of tubular member 14 for the purpose of affording adequate lateral support of member 14. However, at least end 17 of bracket 4 is considerably narrower than the inner diameter of tubular member 14, such that the molding material later applied will freely enter that end of member 14. Thereafter, a central rod 18, which has a length in excess of that of tubular member 14, is disposed centrally within that member and is extended through the bracket end 17, electrical connection being made there with winding lead 6. The assembly thus far recited is next placed in a mold which accommodates the assembly and which positions the hollow terminal 2 in the proper place adjacent member 14 and the aperture 15 therein, and a wholly cylindrical mandrel (not illustrated) having a central bore large enough to acommodate the rod 18 is disposed within tubular member 14 before the molding operation is commenced. The mandrel possesses an outer diameter just permitting it to be positioned within member 14, and the mandrel is slightly spaced axially from the bracket end 17 to provide a short annular space which may be filled with molding material.

The mold cavity employed with the assembly is, of course, shaped to provide the outer configuration of body 1 as it is illustrated in Figure 1, including the thin gasketing ring portion 19 which covers the outermost edge of tubular member 14. Raw molding compound is forced into the mold at a suitable pressure, filling the unoccupied spaces about elements of the assembly, and the material is cured for an appropriate time at elevated temperatures, whereupon the assembly is made integral with the resilient insulating material. When the molded unit is removed from the mold, and the mandrel withdrawn, the terminal block 2 is found to be positioned by the molding material as shown, though not rigidly attached to member 14, and the annular resilient cushioning pad 20 has been formed within the tubular member 14. The molding operation having been completed, the spark gap stud 11 is next inserted through the aperture 15, from within tube 14, into the hollow terminal block 2. Because rod 18 is not yet rigidly positioned at this part of the assembly operation, it may be pushed aside to admit stud 11 into the terminal block. Shoulder 21 on stud 11 locates the stud properly in relation to the tube and terminal block and while a suitable tool is positioned in tube 14 to hold the stud 11, the hollowed top of the stud is staked to the terminal block 2. Figure 2 illustrates this relationship most clearly, and it will be appreciated that the block 2, stud 11, and tubular member 14 are thus rigidly fastened together.

Subsequently, four narrow stacks of core laminations, 10, are individualy slipped into place within the wound end of the tube 14, these narrow stacks abutting one another to form a reactor core which has a hollowed square cross-section. Rod 18 extends through this core, and suitable wedges or spacers 22 may be employed to fix the laminations in place. A radially-slotted insulating washer 23, such as one made of Textolite, is slipped over rod 18, past the stud 11, into abutting relation with the core elements 10, and a lock nut 24 is advanced about rod 18 until the reactor core is axially tightened between washer 23 and the aforementioned resilient pad 20 which is integral with the molding material of body 1. Resilient pad 20 not only advantageously minimizes lamination hum and vibration, but also grips the ends of core elements 10 firmly enough to eliminate the need for core wedges at that end of the assembly. In this connection, it is noted that, at most, wedges or spacers 22 would be used, whereas conventional core assemblies would require radial wedging at both axial ends of the longitudinally-extending core structure.

With lock nut 24 in place, central rod 18 is rigidly positioned centrally of tubular member 14, the washer 23 providing most of the radial support. Gap nut 12 is advanced along a threaded portion of rod 18 until its rounded end is an appropriate distance from the rounded end of stud 11, this spacing being established by a suitably shaped gauge temporarily inserted through the open end of tube 14 for this purpose. A spanner tool may cooperate with recesses 25 in gap nut 12 to preserve the desired gap spacing while a lock nut 26 is tightened against nut 12 to prevent subsequent movements. Accurate adjustment of the spark gap during initial assembly as well as later to meet field requirements is thereby facilitated. End cap 13, which may be of either insulating or conductive material, is placed over rod 18 and the open end of tube 14, and is pressed firmly against the integral end gasket 19 by a terminal block 3 threaded onto the end of rod 18, thereby closing and sealing the tube and spark gap elements. Bolts 27 and 28 cooperate with terminal blocks 2 and 3, respectively, to bind electrical connecting cables which are passed through accommodating apertures in these terminal blocks.

While a particular embodiment of this invention has been shown and described herein, it will occur to those skilled in the art that various modifications can be effected without departing either in spirit or scope from the invention set forth in the appended claims.

What we claim as new and desire to secure by Letters Patent of the United States is:

1. A molded reactor assembly comprising an open-ended hollow cylindrical tube of insulating material, an electrical reactor supported by said tube nearer one end thereof than the other, a conductive rod of length greater than the axial length of said tube disposed coaxially with said tube and with ends of said rod projecting axially outward beyond the ends of said tube, a first electrical terminal having a terminal block extending radially outward from said tube nearer said other end and a spark gap stud electrically and mechanically connected with said terminal block and extending radially inward in said tube nearer said other end for a distance less than the radial distance between said tube and said rod, the spacing between said rod and said stud being greater than spark gap lengths to be used with said reactor, electrical leads connecting said reactor between said terminal block and one projecting end of said rod at said one end of said tube, a spark gap nut axially movable along a threaded portion of said rod for adjustable axial positioning near said spark gap stud to form a spark gap therebetween of length shorter than said spacing, resilient molded material of high dielectric strength surrounding the outside of said tube and said leads and said reactor and closing said one end of said tube, said material bonding said tube and said one projecting end of said rod at said one end of said tube, an end cover slidable over the other projecting end of said rod for closing said other end of said tube, and a second electrical terminal connected with said other projecting end of said rod.

2. A molded reactor assembly comprising an open-ended hollow insulating member, an electrical inductance winding about said member nearer one end thereof than the other, a threaded conductive rod of length greater than the axial length of said member disposed coaxially with said member and with ends of said rod projecting axially outward beyond the ends of said member, core laminations within said member and said winding and disposed nearer said one end of said member, a first electrical terminal having a terminal block extending radially outward from said member near said other end and having a spark gap stud electrically and mechanically connected with said terminal block and extending radially inward within said member near said other end, the spacing between said stud and said rod being greater than spark gap lengths to be used with said reactor, electrical leads connecting said winding between said terminal block and the one projecting end of said rod at said one end of said member, a spark gap nut axially movable along said threaded rod for adjustable axial positioning near said spark gap stud to form a spark gap therebetween of length shorter than said spacing, resilient molded insulating material integrally bonding said one projecting end of said rod, outer surfaces of said member, said winding, said leads and said terminal block, said material closing and sealing said one end of said member, an end cover slidable over the other projecting end of said rod for closing said other end of said member, and a second electrical terminal connected with said other projecting end of said rod.

3. A molded reactor assembly comprising an open-ended hollow insulating tube, an electrical inductance winding wound about said tube nearer one end thereof than the other, a partly-threaded conductive rod of length greater than said tube disposed coaxially within said tube with rod ends projecting from both ends of said tube, core laminations stacked within said tube and winding near said one end and leaving a space within said tube near said other end of said tube, a first electrical terminal having a terminal block extending radially outward from said tube near said other end and having a spark gap stud electrically and mechanically connected with said terminal block and extending radially inward within said tube in said space, said stud and terminal block being rigidly fastened with said tube, and the spacing between said rod and said stud being greater than spark gap lengths to be used with said reactor, electrical leads electrically connecting said winding between said terminal block and the end of said rod projecting from said one end of said tube, a circular spark gap nut axially movable along a threaded portion of said rod in said space for adjustable positioning near said spark gap stud to form a spark gap therebetween of length shorter than said spacing, resilient molded insulating material extending around and integrally bonding said projecting end of said rod, outer surfaces of said tube, said winding, said leads, and said terminal block, said material closing and sealing said one end of said tube and forming a thin cushioning pad within and at said one end of said tube and further covering the tube edges at said other end of said tube to form a resilient gasket thereover, means locked with said rod forcing said core laminations into pressure engagement with said cushioning pad in said tube, an end cover slidable over the other projecting end of said rod for closing said other end of said tube, means locked with said rod forcing said cover into pressure engagement with said gasket, and a second electrical terminal connected with said other projecting end of said rod.

References Cited in the file of this patent

UNITED STATES PATENTS

| | | |
|---|---|---|
| 833,207 | Frank | Oct. 16, 1906 |
| 861,003 | Wagner | July 23, 1907 |
| 1,307,867 | Lee | June 24, 1919 |
| 1,402,037 | Armor | Jan. 3, 1922 |
| 1,941,992 | Makenny | Jan. 2, 1934 |
| 2,348,919 | Milton | May 16, 1944 |